United States Patent
Iwata et al.

(10) Patent No.: US 7,173,227 B2
(45) Date of Patent: Feb. 6, 2007

(54) LASER BEAM PROCESSING APPARATUS

(75) Inventors: Takaaki Iwata, Tokyo (JP); Tetsuya Ootsuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 174 days.

(21) Appl. No.: 10/901,192

(22) Filed: Jul. 29, 2004

(65) Prior Publication Data

US 2005/0199780 A1  Sep. 15, 2005

(30) Foreign Application Priority Data

Mar. 15, 2004  (JP)  .............................. 2004-072256

(51) Int. Cl.
*G01J 1/32* (2006.01)
*B23K 26/04* (2006.01)

(52) U.S. Cl. .................................. 250/205; 219/121.62
(58) Field of Classification Search ................. 250/206
See application file for complete search history.

(56) References Cited

U.S. PATENT DOCUMENTS

| | | | |
|---|---|---|---|
| 6,177,649 B1 * | 1/2001 | Juret et al. ............. | 219/121.63 |
| 6,512,197 B2 | 1/2003 | Horn et al. | |
| 6,710,282 B2 * | 3/2004 | Sonoda et al. ......... | 219/121.63 |
| 2002/0171843 A1 * | 11/2002 | Frankel ........................ | 356/491 |
| 2002/0180967 A1 * | 12/2002 | Shio et al. ................... | 356/326 |
| 2002/0190230 A1 * | 12/2002 | Dworkowski et al. . | 250/559.38 |
| 2004/0002199 A1 * | 1/2004 | Fukuyo et al. ............... | 438/460 |
| 2004/0051860 A1 * | 3/2004 | Honda et al. ............... | 356/4.01 |

FOREIGN PATENT DOCUMENTS

| | | |
|---|---|---|
| JP | 04-081286 | 3/1992 |
| JP | 6091384 | 4/1994 |

* cited by examiner

*Primary Examiner*—Georgia Epps
*Assistant Examiner*—Kevin Wyatt
(74) *Attorney, Agent, or Firm*—Leydig, Voit & Mayer, Ltd.

(57) ABSTRACT

A laser beam processing apparatus includes a laser oscillator for producing a laser beam for processing a processing object, a focus head for focusing the laser beam output from the laser oscillator onto the processing object, a photo detector for detecting light emanating from the processing object in response to irradiation with the laser beam and a reference light generated from a reference light generating unit via a nozzle attached to the focus head, a correlation adjusting unit for adjusting correlation between the light detected during the processing and processing state of the processing object from the reference light detected by the photo detector, and a control unit for controlling the laser oscillator by monitoring the processing situation of the processing object from the light detected during the processing and that is adjusted by the correlation adjusting unit.

6 Claims, 10 Drawing Sheets

LASER BEAM PROCESSING APPARATUS

BACKGROUND OF THE INVENTION

1. Field of the Invention

The present invention relates to a laser beam machine, and more particularly to a laser beam machine that can monitor a processing situation of the workpiece.

2. Description of the Related Art

A conventional laser beam processing apparatus has been well known, which comprises a laser oscillator for producing a laser beam, a focus head for directing the laser beam from this laser oscillator onto a processing object, photo detecting means for detecting a light emanating from a portion of the processing object fused by irradiation with the laser beam, and a control unit for controlling the laser oscillator while monitoring a processing situation of the workpiece based on the quantity of light detected by the photo detecting means (e.g., refer to JP-A-4-81286, page 2, FIG. 1). Also, the above laser beam processing apparatus may be provided with reference light generating means and a detection function determining portion, so that the photo detecting means is determined as defective if the detected quantity of light is smaller than a preset quantity of light (e.g., refer to JP-A-2705485, page 1, FIG. 1).

SUMMARY OF THE INVENTION

Since the laser beam processing apparatus capable of monitoring the processing situation is not provided with units for checking the validity of the function of detecting unit itself, the processing situation of the workpiece may be falsely grasped, when the function of detecting the light is degraded. Or even with the means for checking the validity of the function of detecting unit itself, there was no description about unit for suppressing other factors having influence on the monitoring precision, for example, factors such as the nozzle characteristics other than the detecting means.

That is, generally, the quantity of received light detected by the detecting unit is varied with the output of laser beam, the focal position, and the processing speed, which decide the quality of processed face. Usually, as the quantity of receiving the reflected light is smaller, the quality of processed face is better. The factors of fluctuating the quantity of received light may include the sputter sticking to the nozzle, and the processing direction, in addition to the processing situation of the workpiece and the validity of the function of the detecting unit itself. In this way, if the detected quantity of received light is changed due to various factors, the excellent processing is not consequently expected. Accordingly, it is required to make correct monitoring for the processing situation. For this purpose, it is required to exclude the factors of fluctuating the quantity of received light that are irrelevant to the processing quality.

In the light of the above-mentioned problems, it is an object of the present invention to provide a laser beam machine that can process the workpiece at high precision by suppressing the influence from the factors of changing the quantity of received light.

To achieve the above object, a laser beam processing apparatus according to this invention includes a laser oscillator for oscillating a laser beam for processing a processing object, a focus head for focusing the laser beam output from the laser oscillator onto the processing object, a photo detecting unit for detecting a light emanating from the processing object by irradiation with the laser beam and a reference light generated from a reference light generating unit via a nozzle attached to the focus head, a correlation adjusting unit for adjusting the correlation between the detected quantity of light during the actual processing and a processing state of the processing object from a value of the reference light detected by the photo detecting unit, and a control unit for controlling the laser oscillator by monitoring the processing situation of the processing object from the detected quantity of light during the actual processing that is adjusted by the correlation adjusting unit.

With the constitution of the invention, it is possible to monitor the processing state without calibration of the photo detecting unit to consider variations in the characteristics of the photo detecting unit, irrespective of the nozzle characteristics (nozzle diameter, new article and so on).

DETAILED DESCRIPTION OF THE PREFERRED EMBODIMENTS

Embodiment 1

Figure 1:
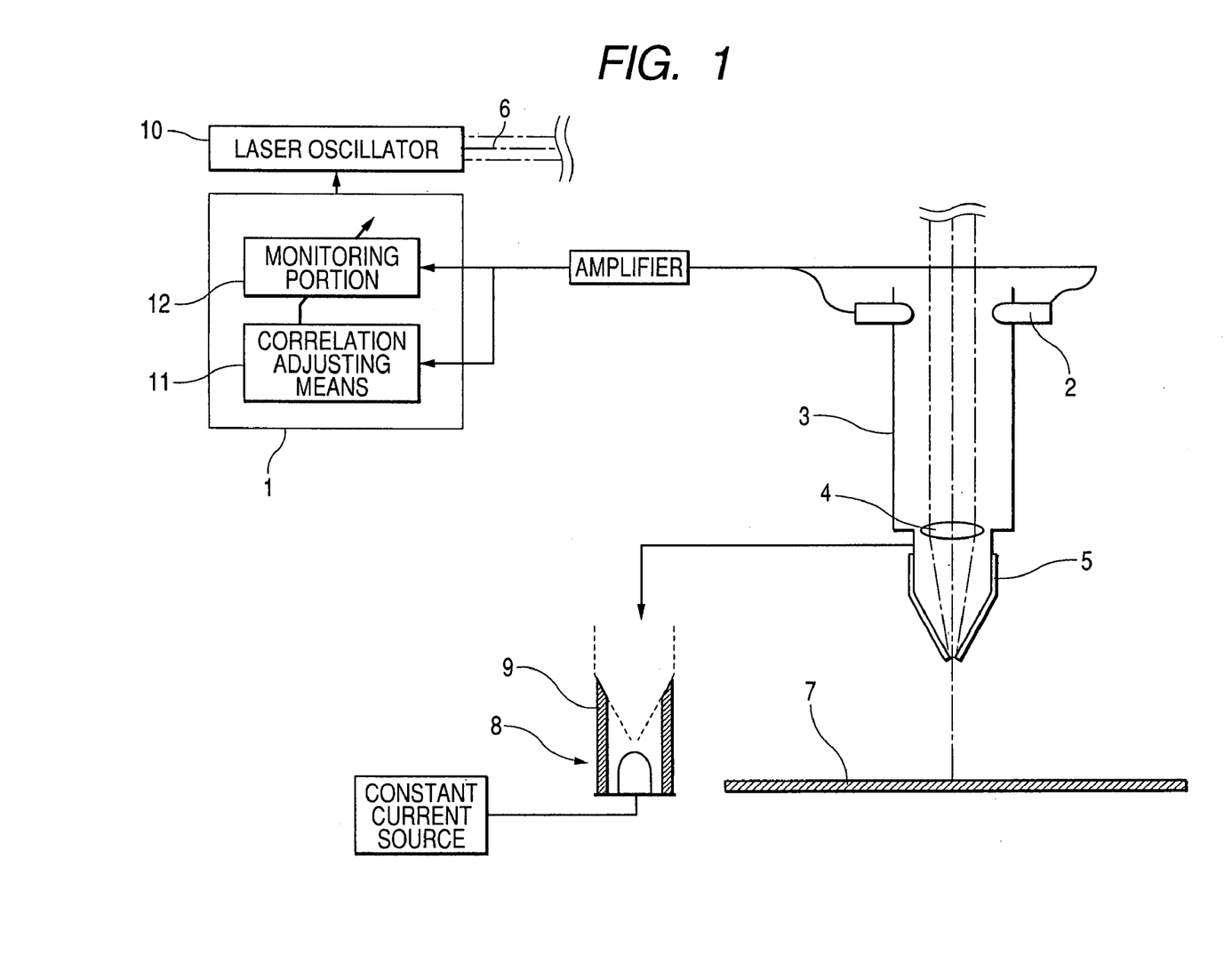
FIG. 1 is a schematic diagram of a laser beam processing apparatus according to an embodiment 1 of the present invention.

FIG. 1 is a schematic diagram of a laser beam processing apparatus according to an embodiment 1 of the present invention. The laser beam processing apparatus comprises a laser oscillator 10 for oscillating a laser beam 6, and a focus head 3 for accommodating a condensing lens 4 for condensing the laser beam 6 oscillated from the laser oscillator 10. The laser oscillator 10 has the oscillation timing, the duty ratio and the repeated frequency that are controlled by a control unit 1. The focus head 3 is moved up or down by a lifter, not shown, whereby a processing object 7 is processed by laser in a desired manner by moving the focus head 3 relative to a processing table, not shown, with a processing object 7 mounted, in the directions orthogonal to each other on the horizontal plane, using a drive mechanism such as a ball screw or a linear motor. A top end portion of the focus head 3 has a structure in which a nozzle 5 can be mounted or dismounted. The flow rate of a processing gas flowing through the focus head can be adjusted by changing the nozzle diameter.

The focus head 3 has a photo sensor such as a photo diode (desirably three or more photo sensors) mounted. A detected signal is amplified by a sensor amplifier, and input into the control unit 1. The reason why three or more photo sensors are employed is to consider light polarization depending on the processing direction. The photo detecting means 2 is composed of a photo sensor and a sensor amplifier. A laser beam 6 from the laser oscillator 10 that is controlled by the control unit 1 is condensed by the condensing lens 4 of the focus head 3, and applied onto the processing object 7. The photo sensor making up the photo detecting means 2 senses a light produced by irradiation with the laser beam 6 through a hole of the nozzle 5. The quantity of light detected by the photo detecting means 2 is monitored by a monitoring portion 12 of the control unit 1 to determine the processing state. The monitoring portion controls the laser oscillator 10, based on the detected quantity of light, so that the excellent processing result may be obtained by changing the processing conditions. In FIG. 1, the slant arrow indicates that the parameter adjustment is made. In the subsequent figures, the same is also true.

Also, the laser beam processing apparatus is provided with reference light generating means 8. The reference light generating means 8 comprises a light emitting element such as an LED, an LED power source such as a constant current source, and a guide 9 provided to cover the light emitting element. This guide 9 is fitted with the nozzle 5. In measuring a reference light, the laser beam processing apparatus aligns the position of the nozzle 5 to be fitted into the guide 9 using the lifter and the drive mechanism. Owing to the guide 9, the photo detecting means 2 measures a light of the reference light generating means 8 at a fixed distance without receiving an external light. A contact portion between the guide 9 and the nozzle 5 is covered with rubber not to damage the nozzle.

Figure 2:
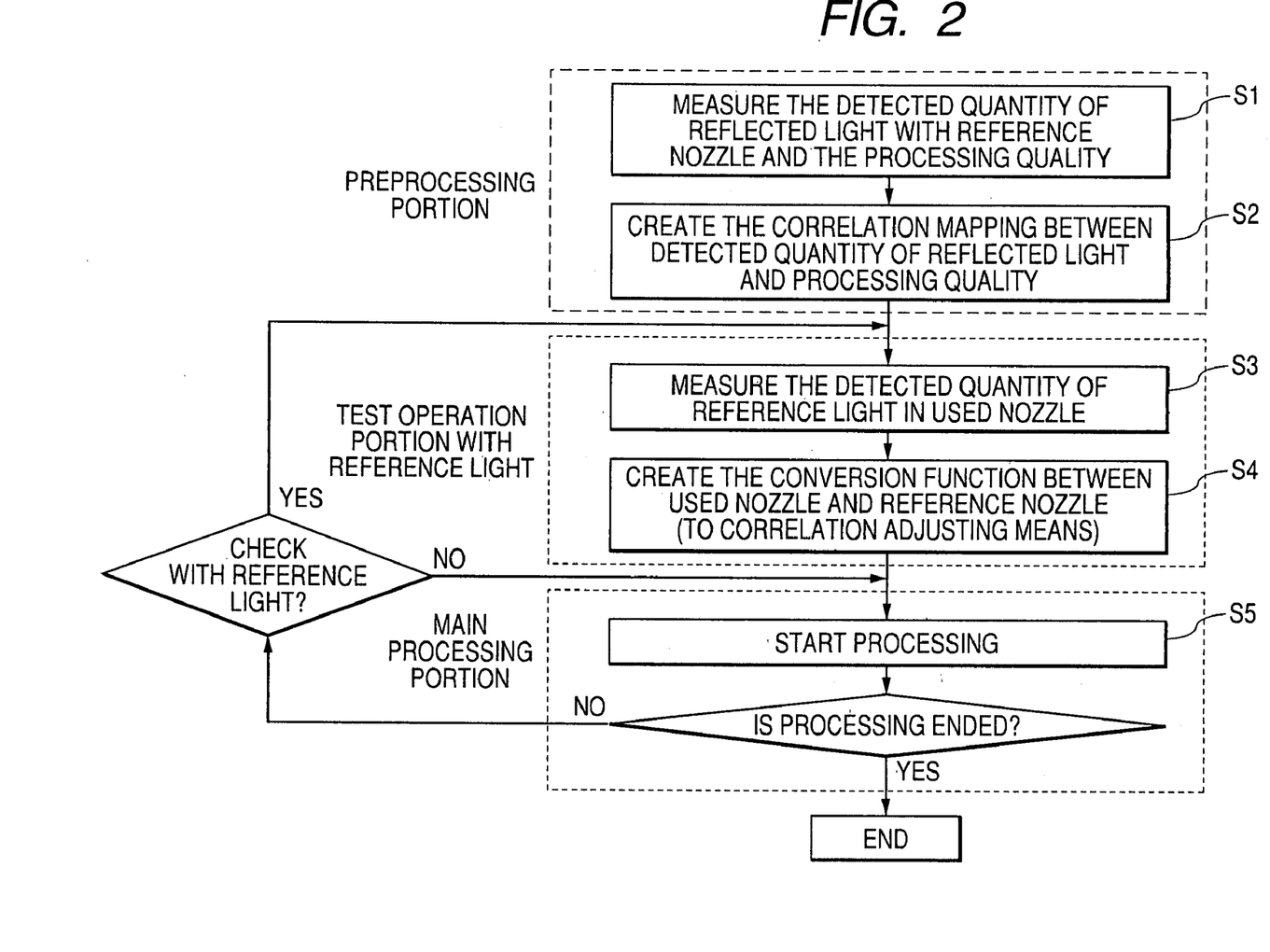
FIG. 2 is a flowchart showing an overall processing procedure of the laser beam processing apparatus according to the embodiment 1 of the invention.

A processing procedure flow of this invention will be described. FIG. 2 is a flowchart showing an overall processing procedure of the laser beam processing apparatus. The processing procedure is largely divided into a preprocessing portion, a test operation portion with reference light, and a main processing portion. In the preprocessing portion before shipment to the factory, the detected quantity of reflected light from a molten portion detected by the photo detecting means 2 and the processing quality at that time are measured employing a reference nozzle NA (S1). The correlation between the detected quantity of reflected light and the processing quality is mapped (S2). The test operation portion with reference light is performed for a nozzle NB used before the actual main processing. Accordingly, the operation is performed for every rod or at regular intervals of time (S3, S4). The main processing portion actually processes the processing object by irradiation of a laser beam (S5).

Figure 3:
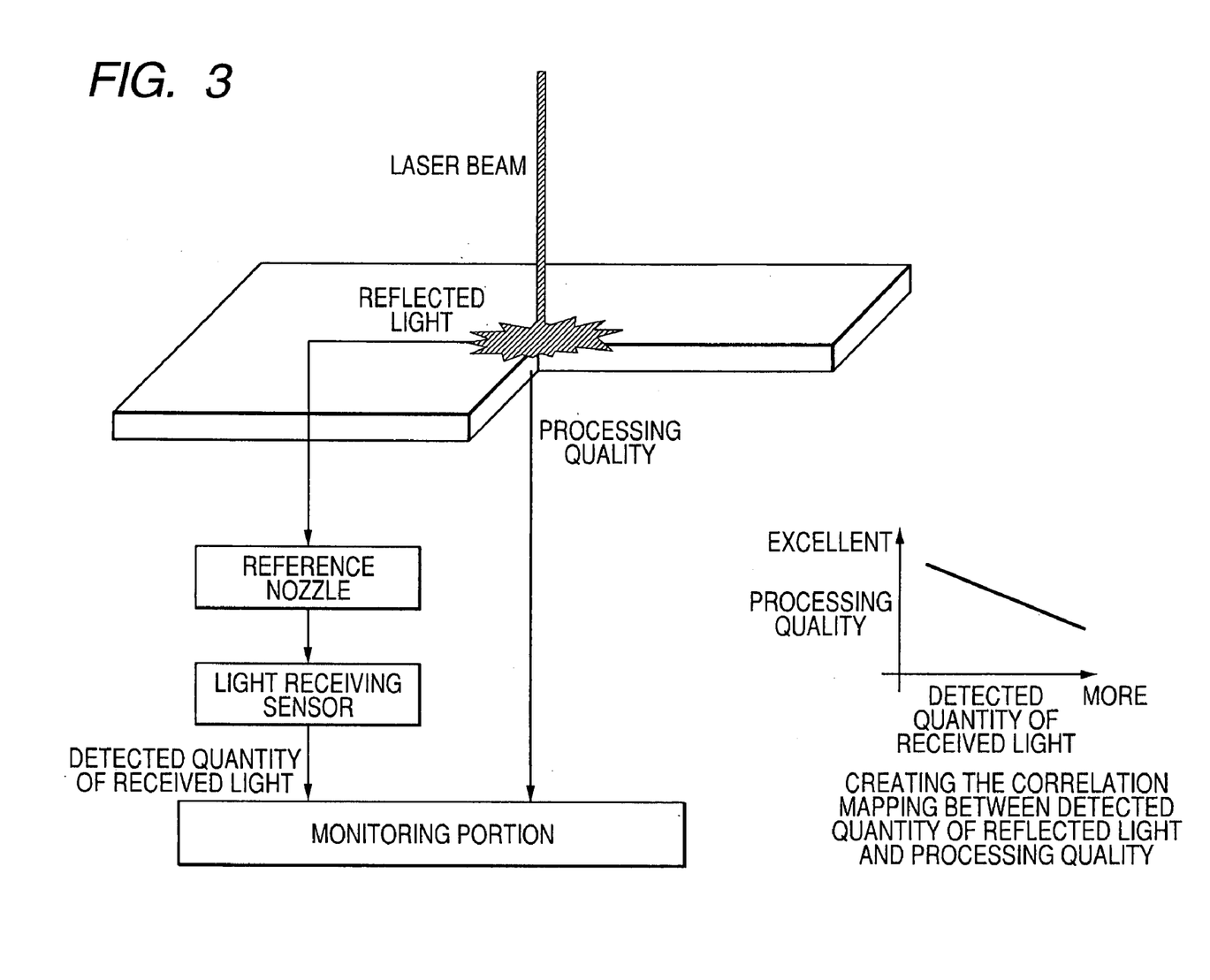
FIG. 3 is a schematic diagram of a preprocessing portion in the processing procedure of the laser beam processing apparatus according to the embodiment 1 of the invention.

Referring to FIG. 3 showing a schematic diagram of the preprocessing portion, the contents of the flow in the preprocessing portion will be additionally described. The laser beam processing apparatus of the invention performs the processing for various kinds of processing objects, before shipment to the factory. The normal processing conditions are prepared so that the user may simply select the processing conditions. A reference nozzle is employed in this processing before shipment to the factory. The reference nozzle may be prepared individually depending on the material and thickness of processing object. The processing according to the circular curve or radial line in an embodiment 3 is also made in the preprocessing operation.

Figure 4:
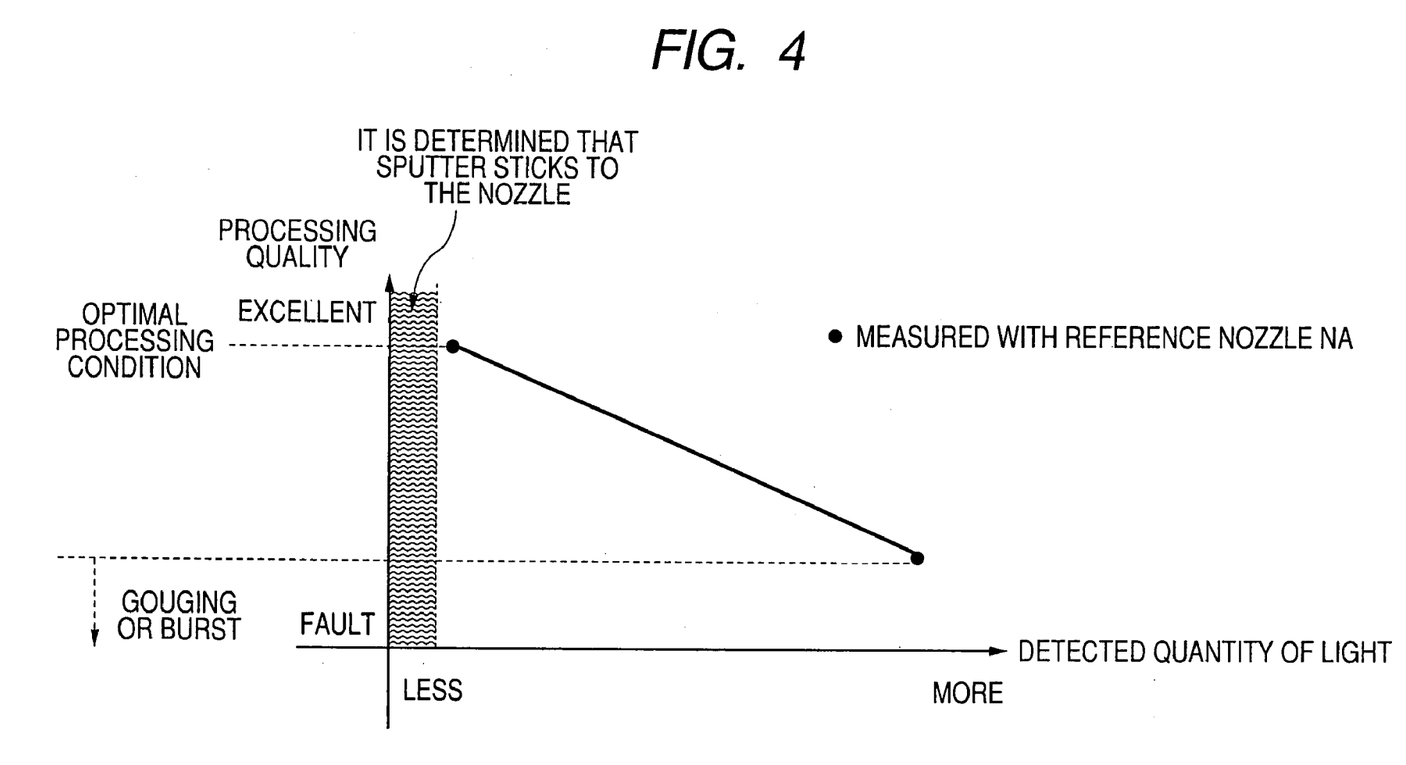
FIG. 4 is a schematic diagram of a correlation mapping between the detected quantity of reflected light and the processing quality.
Figure 5:
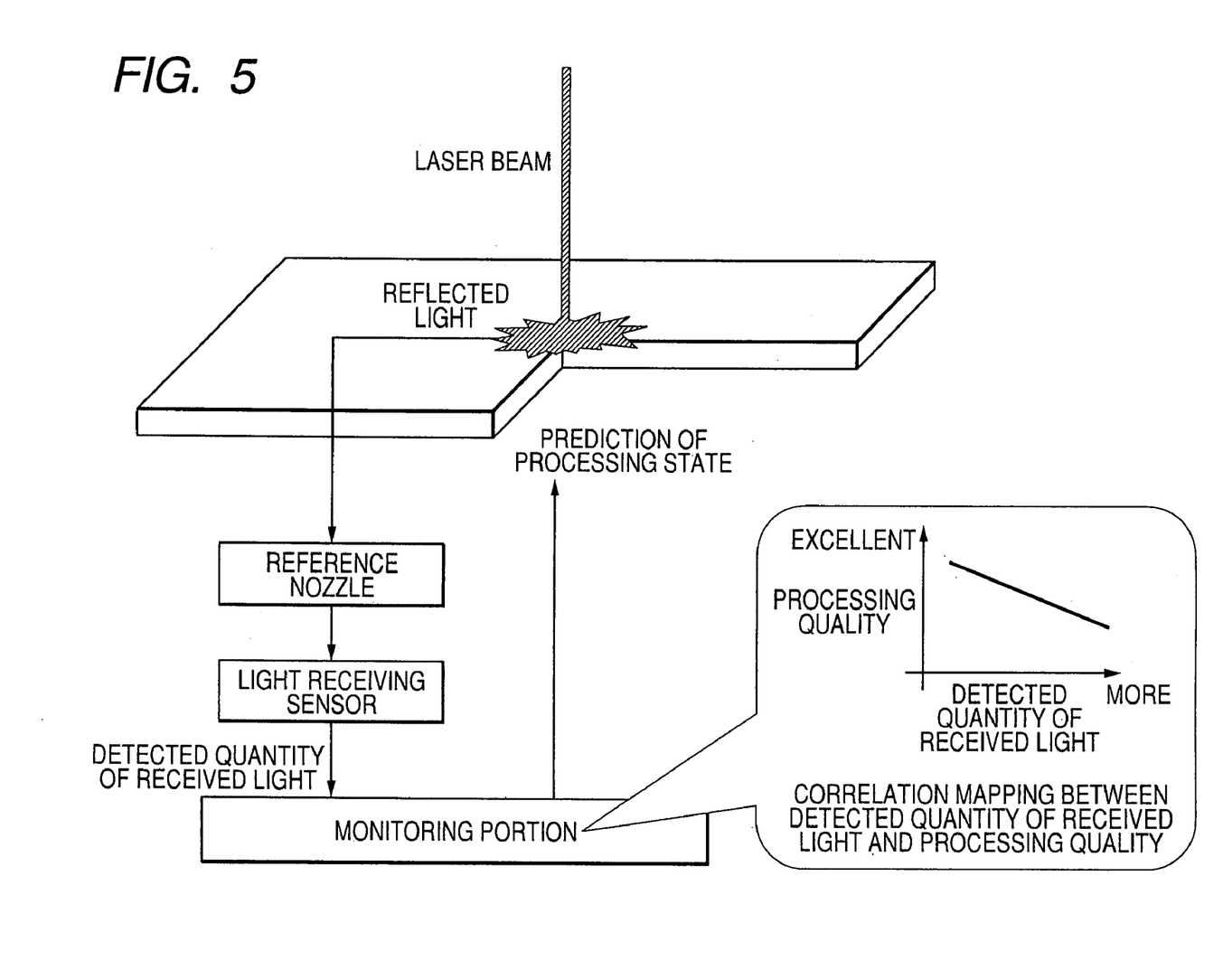
FIG. 5 is a diagram showing a predicted processing state.

Generally, if the processing quality is better, the reflected light from the molten portion is reduced. Accordingly, if the machining is performed under the conditions for the highest processing quality, and the reflected light from the molten portion is measured by the photo detecting means 2, it is found whether the processing conditions are optimal or not, based on the detected level of reflected light. On the contrary, if the processing conditions are bad, the quantity of reflected light from the molten portion is increased. Further, if the processing conditions are worse, the normal processing is not made anymore, causing a burning or gouging. Herein, the burning is defined as a phenomenon of excessive burning due to the increased cutting groove width, and the gouging is defined as a phenomenon of blowing up the melt. When the stainless material is processed, the reflected light is smaller under the conditions of higher processing quality, and if the processing conditions are worse, a plasma is produced. FIG. 4 is a schematic diagram showing the mapping of the correlation between the detected quantity of reflected light and the processing quality. With this correlation, the processing state is monitored from the quantity of reflected light during the main processing (FIG. 5). Also, when the detected quantity of light is apparently smaller than the quantity of light under the optimal processing conditions during the main processing, it is determined that the sputter sticks to the nozzle.

Figure 6:
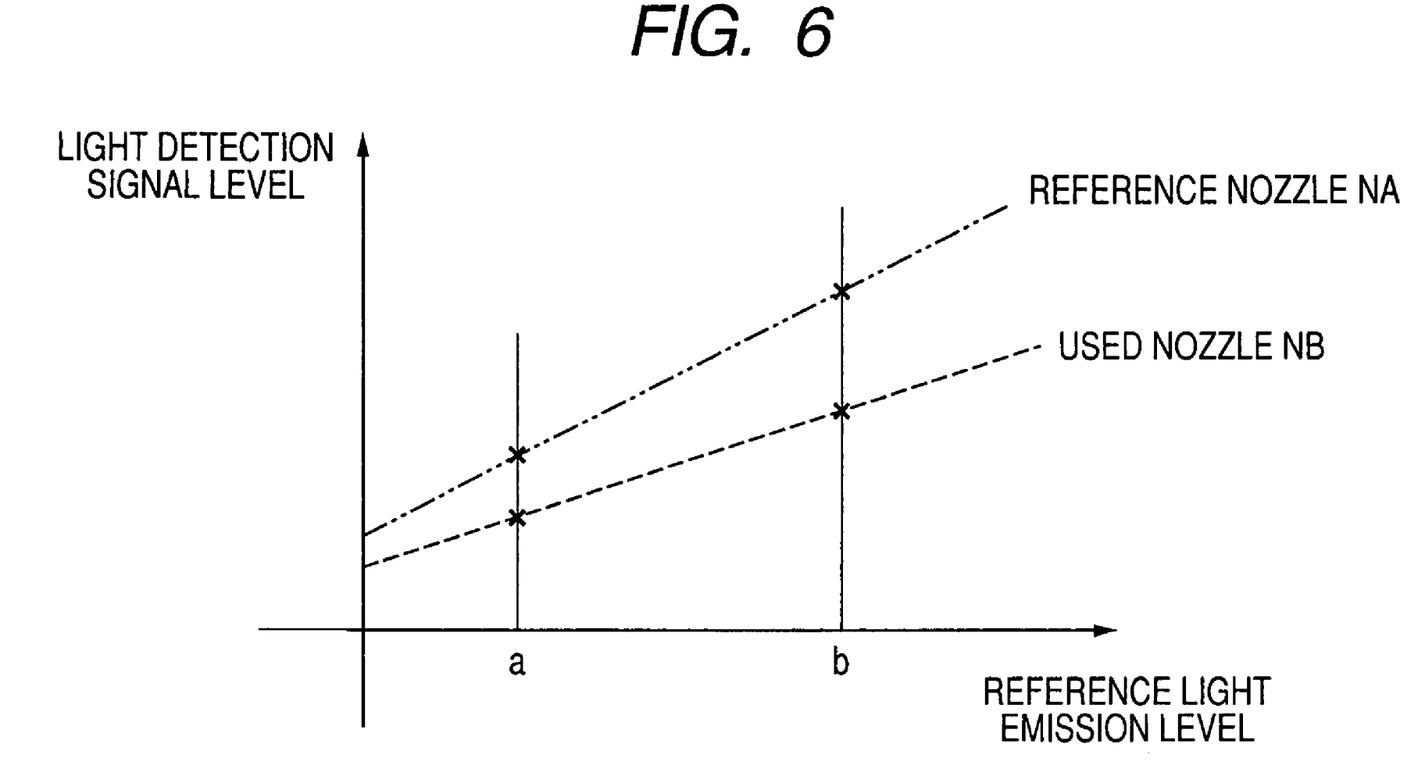
FIG. 6 shows measured results when a reference light is emitted at two different emission levels.
Figure 7:
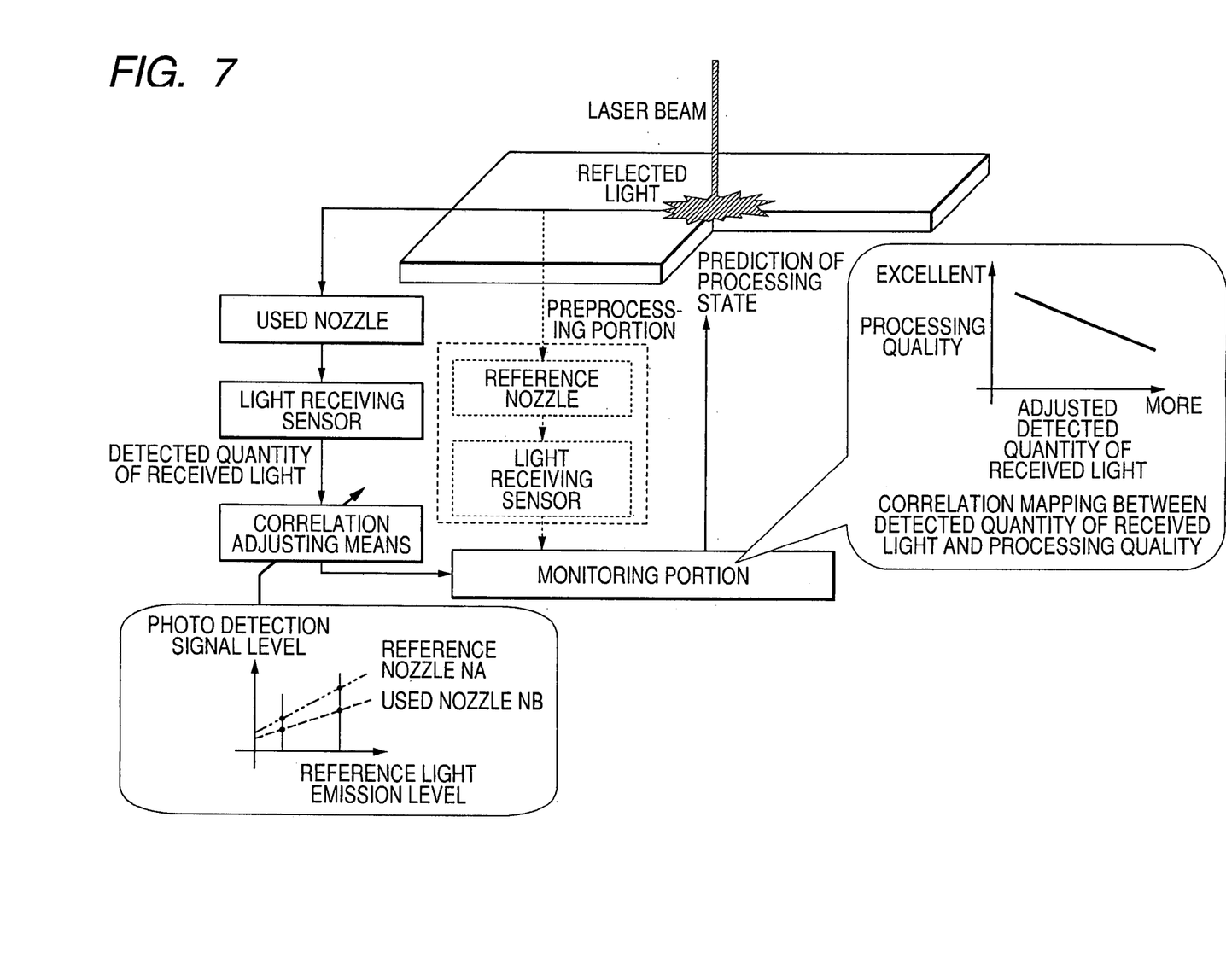
FIG. 7 is a flowchart for adjusting the detected quantity of light.

A flow of the test operation portion with reference light before starting the actual processing will now be described. Herein, the reference light is measured via the nozzle. Measurement of the reference light is made at a position where the focus head is moved to fit the nozzle 5 into the guide 9, as shown in FIG. 1. FIG. 6 shows an example of measurement result. From the characteristics of the nozzle NB for use in the main processing and the reference nozzle NA, correlation adjusting means 11 adjusts the detected quantity of received light. FIG. 7 shows a diagram of its flow. In FIG. 7, a frame part indicated by the broken line represents the preprocessing portion.

Finally, a flow of the main processing portion will be described below. In this main processing, the reflected light from the molten portion is measured on line using the photo detecting means 2. When the reflected light level is increased, the control unit 1 adjusts the parameters such as processing speed and laser power to perform the processing under the optimal processing conditions. More details will be given below.

The processing apparatus of this invention can monitor a processing situation of processing object from the detected quantity of light during the actual processing that is adjusted by the correlation adjusting means 11 of the control unit 1 based on the detected quantity of reference light detected by the photo detecting means 2. For example, if the diameter of the nozzle 5 is changed, the quantity of light entering the focus head 3 is proportionally changed in accordance with the area of the hole, for which the adjustment is required. The adjustment principle will be now described. The laser beam processing apparatus of this invention performs the processing for various kinds of processing object before shipment to the factory, in which the normal processing conditions are prepared so that the user may simply select the processing conditions. In the processing before shipment to the factory, the reference nozzle is employed. The reference nozzle may be prepared individually depending on the material or thickness of processing object.

In the laser beam processing apparatus of this invention, the reference light is measured beforehand, employing this reference nozzle. Measurement of the reference light is made at a position where the focus head is moved to fit the nozzle 5 with the guide 9, as shown in FIG. 1. Also, the reference light is emitted at two or more emission levels and measured in view of the input/output characteristic of reference light to light receiving sensor. FIG. 6 shows an example of measurement result when the reference light is emitted at two emission levels a and b. An example of the measurement result with the reference nozzle is indicated by NA in FIG. 6. Though the input/output characteristic between the emission levels a and b is decided by the characteristics of LED for use with the reference light and the characteristics of the light receiving sensor, it is desired that the characteristics may be linear, if possible, for easier operation. Thereby, the characteristic for a-b is linearly approximated as shown in FIG. 6. Before the main processing, the user mounts the nozzle NB for use in the main processing, and measures the reference light in the same manner.

The laser beam processing apparatus of this invention is provided with the reference light generating means 8 at a predetermined position to make the automatic measurement in accordance with an algorithm of moving the focus head 3 to fit the nozzle 5 with the guide 9, emitting the reference light at several emission levels, and measuring the quantity of light with the photo detecting means. An example of its measurement result is indicated by NB in FIG. 6. Even when the nozzle NB is employed, the input/output characteristic is fundamentally decided by the characteristics of LED for use with the reference light and the characteristics of the light receiving sensor, whereby the characteristic curve is similar to that for NA. In this example, since the LED and the light receiving sensor are employed to provide the linear input/output characteristic, the characteristic of a-b for NB is also linearly approximated. If the nozzle having a large opening diameter is employed, a greater quantity of light enters into the nozzle, so that the gradient of NB is increased. Also, if the nozzle has the same diameter but a long service time, the surface of nozzle is oxidized to decrease the reflectance of light, whereby the gradient of NB is slightly smaller. When the nozzle NB is employed, the correlation adjusting means 11 makes the adjustments of a photo detecting signal, for example, in terms of the gain and offset, during the main processing, so that the characteristic of the nozzle NB may be matched with the characteristic of the nozzle NA. By making the adjustments in this way, the reference light is detected under the actual processing conditions, whereby the reference light measuring operation is automatically performed by eliminating the influence due to a dispersion in the nozzle state or the light receiving sensor, and a difference in the mounting position.

The monitoring portion 12 of the control unit 1 will be described below. The monitoring portion is intended to monitor the processing state of processing object during the processing. Generally, as the processing conditions are better, the reflected light from the molten portion of processing object is smaller. Accordingly, if the quantity of light for processing under the optimal processing conditions is stored, the processing conditions are determined from the photo detection signal level from the photo detecting means 2.

In the laser beam processing apparatus of this invention, the quantities of light under the optimal processing conditions for various standard processing materials are measured and stored. Accordingly, the photo detection signal during the main processing adjusted by the correlation adjusting means 11 is greater than the quantity of light under the optimal processing conditions, the processing conditions are not optimal, and this situation is informed to the user. In this case, the processing conditions are changed to make the machining under the more favorable processing conditions.

Also, the light detected quantity of reference light detected by the photo detecting means 2 is monitored by the monitoring portion and adjusted by the correlation adjusting means 11 of the control unit 1 in this invention. Accordingly, if the diameter of the nozzle 5 is changed, the quantity of light entering the focus head 3 is changed in accordance with the area of its hole, but the correlation adjusting means 11 can eliminate its influence. Though the nozzle is often made of metal such as copper, the reflectance of light may be different depending on the new article, oxidation or surface contamination. In this invention, this influence is also eliminated by providing the reference light generating means 8 and the correlation adjusting means 11. That is, with this invention, the processing state is monitored at high precision without regard to the nozzle state (diameter, new article).

Generally, there is a dispersion in the characteristic of the light receiving sensor. Conventionally, when it is desired to monitor the processing situation, especially in cutting the thick plate, at high precision, it was required to calibrate the light receiving sensor. Herein, the calibration operation for each light receiving sensor is dispensed with by providing the reference light generating means 8 and the correlation adjusting means 11.

Further, even though the photo detecting means itself is calibrated properly, the quantity of light detected may be different with the position of mounting the photo sensor, as well known. Particularly, when the melt is blown up by gouging, and the sputter sticks to the nozzle, the influence is increased. Conventionally, when there was some sputter sticking to the nozzle, the operator was required to stop the processing apparatus every time, remove the nozzle, and make visual inspection. In this invention, the light detected quantity of reference light detected by the photo detecting means 2 is monitored by the monitoring portion and adjusted by the correlation adjusting means 11 of the control unit 1. Therefore, the correlation adjusting means 11 can eliminate the influence of a change in the quantity of incident light on the focus head 3 caused by a change in the diameter of the nozzle 5 due to the sputter sticking to the nozzle, namely, a change in the area of the nozzle hole.

Other than the change in the diameter of the nozzle 5 due to the sputter sticking to the nozzle as described above, the nozzle hole may be deformed by contact with the processing object. In this invention, when the detection light quantity is smaller than a predetermined value in measuring the reference light, the correlation adjusting means 11 determines abnormality, and displays a warning message for this situation, preventing this faulty processing in advance.

In the above way, since the correlation adjusting means 11 is provided in this invention, there are advantages in addition to the above that a piercing end detection is made correctly in a piercing processing, the plasma detection is made correctly when a plasma is detected from the photo detection signal, and the burning or gouging is detected correctly when burning or gouging is detected from the photo detection signal.

Embodiment 2

Figure 8:
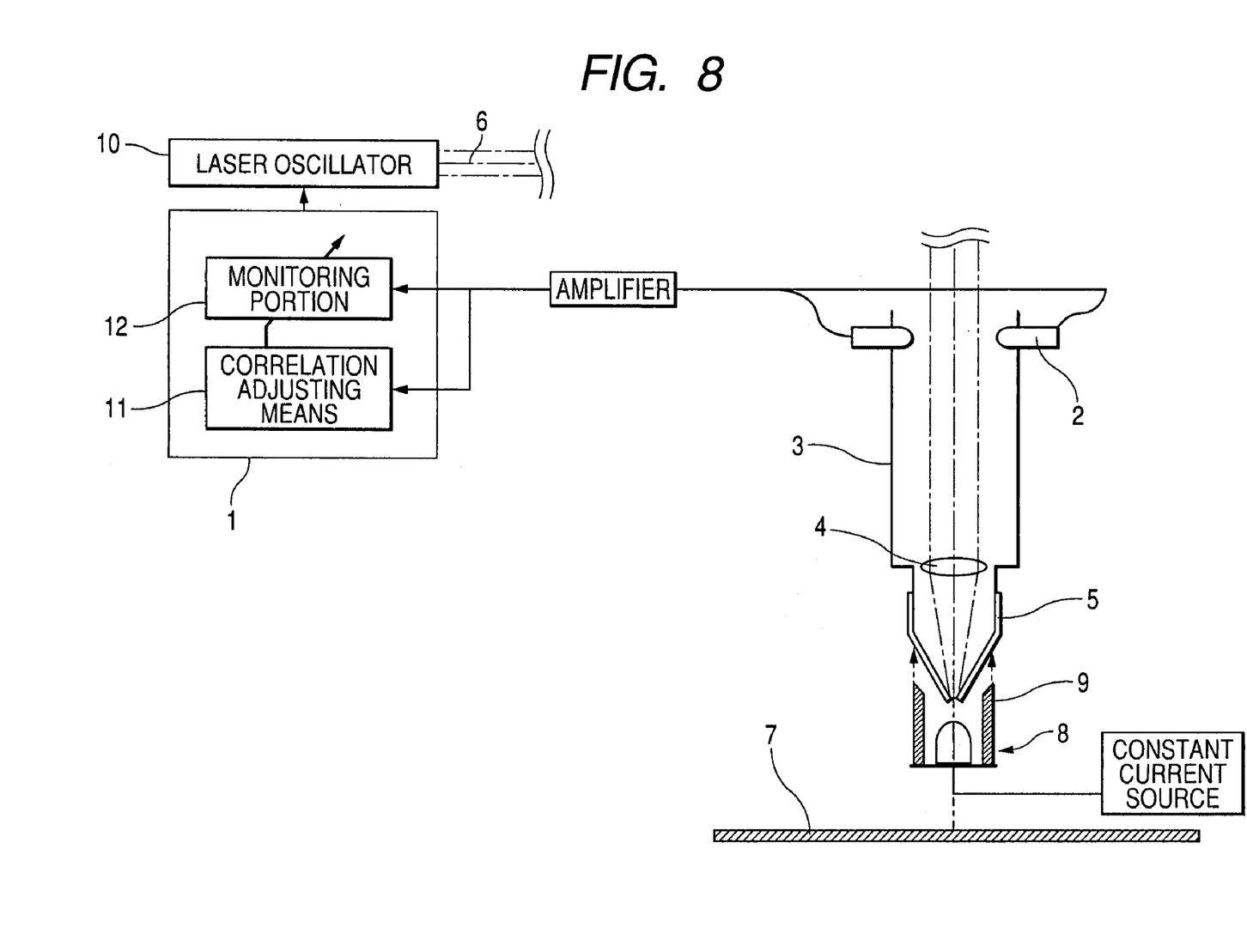
FIG. 8 is a schematic diagram showing a laser beam processing apparatus according to an embodiment 2 of the invention.

FIG. 8 is a schematic diagram showing a laser beam processing apparatus according to an embodiment 2 of the invention. The embodiment 2 has basically the same components as the embodiment 1. However, the reference light generating means 8 is portable, as shown in FIG. 8. The reference light generating means 8 has a detachable guide 9 at the top end portion of the nozzle 5. Unlike the embodiment 1, the user manually mounts the reference light generating means 8 on the nozzle 5, when the reference light is measured. Since the reference light generating means is portable, there is the advantage that it is unnecessary to have a space for the reference light generating means 8 on the processing table.

Embodiment 3

In the laser processing, emission of light or production of plasma in the molten portion of processing object occurs in the wide range. Generally, the light receiving sensor has directivity. Therefore, there is a close relation between the mounting direction of sensor and the processing direction, in which monitoring the processing state is affected by the processing direction. Accordingly, the photo detecting means is usually composed of a plurality of light receiving sensors, but the processing conditions must be minutely set to realize the high quality processing in cutting the thick plate, whereby the use of the plurality of light receiving sensors is insufficient. In this case, it is required to monitor the processing state precisely, and provide a function of eliminating the influence caused by the processing direction. The laser beam processing apparatus according to the embodiment 3 of the invention has this function of eliminating the influence caused by the processing direction (FIG. 9).

Figure 9:
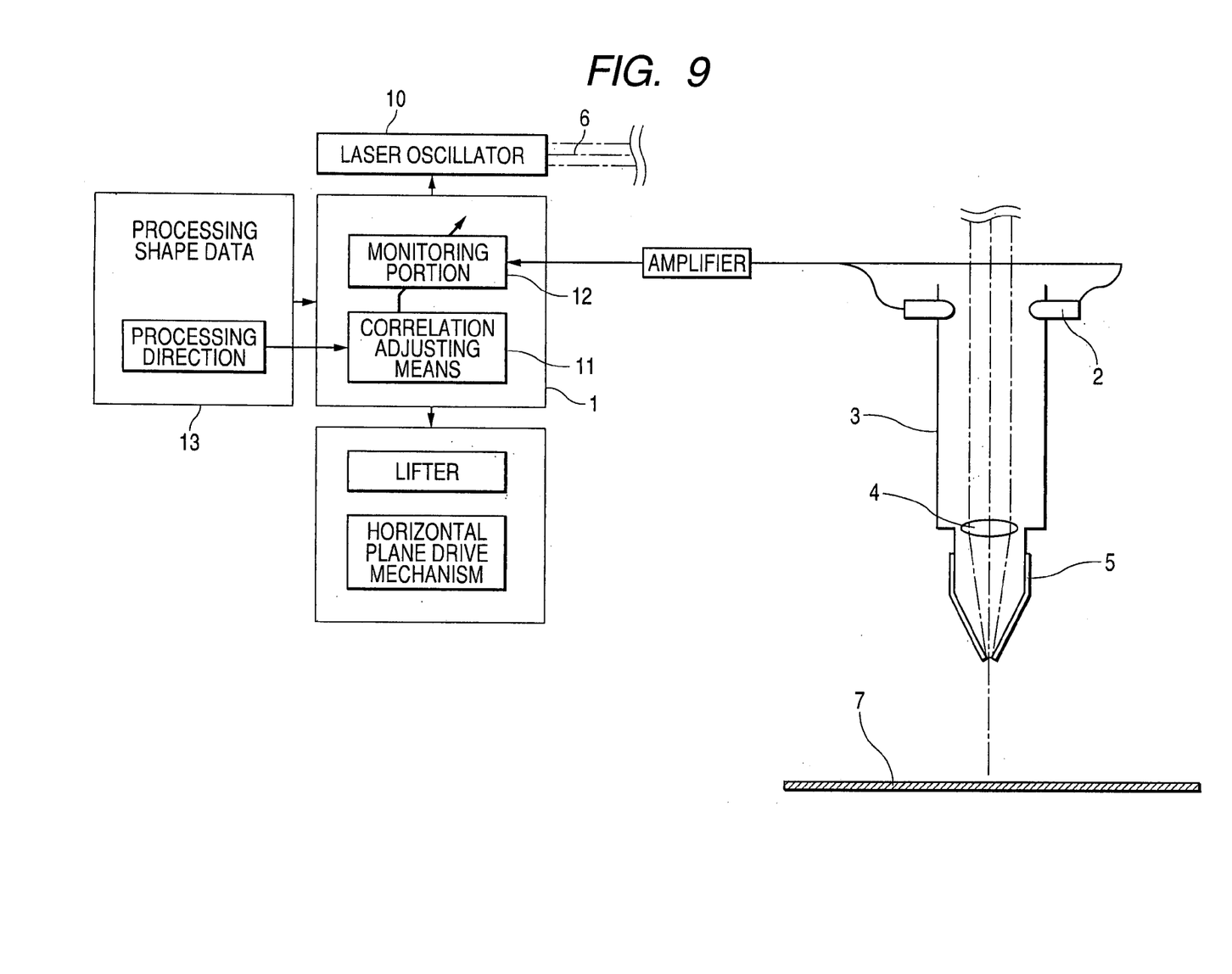
FIG. 9 is a schematic diagram showing a laser beam processing apparatus according to an embodiment 3 of the invention.

FIG. 9 is a schematic diagram showing a laser beam processing apparatus according to an embodiment 3 of the invention. The laser beam processing apparatus as shown in FIG. 9 comprises a data storing portion 13 for storing the processing shape data. In the laser beam processing apparatus, the control unit 1 controls the laser oscillator 10, the lifter for lifting the focus head 3, and the horizontal plane drive mechanism, based on the shape data from the data storing portion 13, to make desired laser processings.

When the laser processings are made, the photo detecting means 2 receives a light in the molten portion of the processing object 7 through the hole of the nozzle 5. The monitoring portion of the control unit 1 determines the processing state based on the quantity of light detected by the photo detecting means 2. The laser beam processing apparatus can correct the detected light quantity signal detected in the processing direction (two dimensions).

Figure 10:
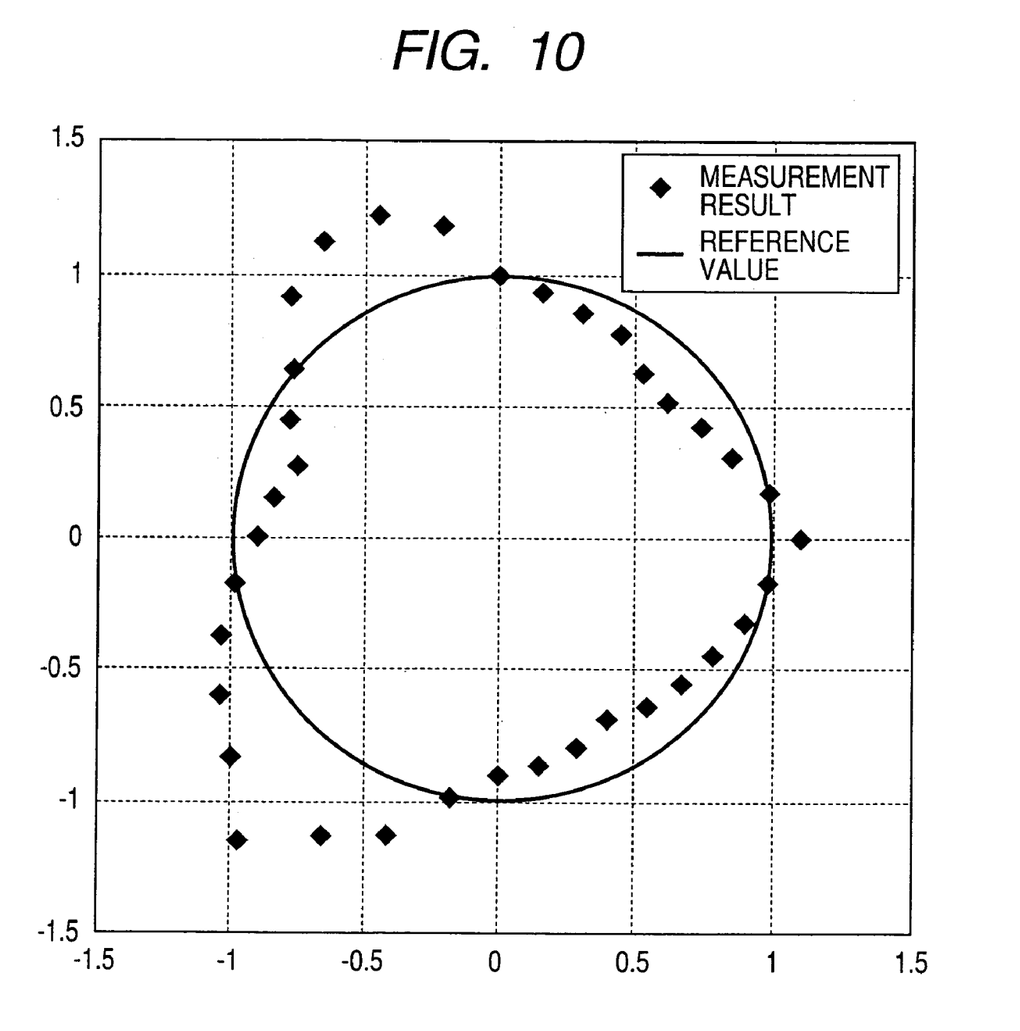
FIG. 10 is a diagram showing a measurement result example of the characteristic in a nozzle processing direction.

Herein, a correction principle will be described in more detail. The processing apparatus of this invention has already performed the processings for various processing objects before shipment to the factory, in which the normal processing conditions are prepared. In this processing before shipment to the factory, the circular curve or radial line is under the same processing conditions. Irrespective of the same processing conditions, the photo detecting signal level may be difference with the processing direction owing to the relation between the emission pattern from the fused portion of the processing object and the mounting direction of the light receiving sensor in the photo detecting means 2. For example, the radial line is processed at equal angular interval to calculate the average value of photo detection signal around one circle. FIG. 10 shows a measurement result example of the characteristic. The correlation adjusting means 11 adjusts the correlation by calculating a correction coefficient in the following way. The correction coefficient is obtained for each processing direction by dividing the photo detection signal level in each processing direction by the average value of photo detection signal levels around one circle. If a sufficient number of measuring points are kept, the processing may be made at other angles than the practiced angle. In this case, the linearity may be assumed from the correction coefficients of two adjacent angles.

The correlation adjusting means 11 of the control unit 1 adjusts the monitoring portion depending on the processing direction. More specifically, the correlation adjusting means 11 makes the gain adjustment for the detected quantity of light with the correction coefficient stored in advance, based on the processing direction. Thereby, in the laser beam processing apparatus of this invention, the processing state is monitored at high precision, irrespective of the processing direction. The laser oscillator 10 is controlled to obtain the processing result.

What is claimed is:

1. A laser beam processing apparatus comprising:
    a laser oscillator producing a laser beam for processing an object;
    a focus head focusing the laser beam output from the laser oscillator onto the object;
    a photo detecting unit detecting (i) light emanating from the object due to irradiation during processing of the object with the laser beam, and (ii) detecting reference light generated by a reference light generating unit and supplied to the photo detecting unit via a nozzle attached to the focus head;
    a correlation adjusting unit adjusting correlation between (iii) the light emanating from the object during processing of the object with the laser beam and detected by the photo detecting unit, and (iv) processing condition of the object, the correlation being adjusted based on the reference light detected by the photo detecting unit; and
    a control unit controlling the laser oscillator in response to monitoring of the processing condition of the object during processing of the object with the laser beam, based on the light emanating from the object during the processing of the object with the laser beam and detected by the photo detecting unit, and based on the correlation that has been adjusted by the correlation adjusting unit.

2. The laser beam processing apparatus according to claim 1, wherein the reference light generating unit includes a guide having a shape fittable to the nozzle.

3. The laser beam processing apparatus according to claim 1, wherein the reference light generating unit emits the reference light at at least two different emission levels.

4. The laser beam processing apparatus according to claim 3, wherein input/output characteristic of the reference light into/out of the photo detecting unit is linear between the two emission levels.

5. The laser beam processing apparatus according to claim 1, wherein the photo detecting unit includes at least three sensors.

6. The laser beam processing apparatus according to claim 1, wherein the light detected by the photo detecting unit is corrected for each processing direction.

* * * * *